United States Patent [19]

Conery et al.

[11] 4,339,231

[45] Jul. 13, 1982

[54] MOTOR CONTROL HOUSING AND JUNCTION BOX FOR A SUBMERSIBLE PUMP

[75] Inventors: William J. Conery; Terry L. Kiplinger, both of Ashland, Ohio

[73] Assignee: McNeil Corporation, Akron, Ohio

[21] Appl. No.: 127,793

[22] Filed: Mar. 6, 1980

[51] Int. Cl.³ .............................................. F04B 49/04
[52] U.S. Cl. ...................................... 417/40; 417/422; 174/52 R; 310/71; 310/112
[58] Field of Search ............... 417/40, 422; 174/52 R; 310/71, 112

[56] References Cited

U.S. PATENT DOCUMENTS

| | | | |
|---|---|---|---|
| 2,433,511 | 12/1947 | Goodard | 174/52 R |
| 3,197,085 | 7/1965 | Deters et al. | 417/422 X |
| 3,353,068 | 11/1967 | Turk | 174/52 R X |
| 3,457,866 | 7/1969 | Komor | 417/422 |
| 3,811,793 | 5/1974 | Kobayashi | 417/40 |
| 3,830,955 | 8/1974 | Double | 310/71 X |
| 3,989,333 | 11/1976 | Cauldwell | 174/52 R X |
| 4,001,533 | 1/1977 | Conery et al. | 200/84 C |

*Primary Examiner*—Leonard E. Smith
*Attorney, Agent, or Firm*—Hamilton, Renner & Kenner

[57] ABSTRACT

A housing (12) carries a plurality of electrical components (32, 34, 36, 38) for controlling a submersible pump (70). A junction box (14) is attached to the housing (12) and receives a conduit (P) providing electrical power from a power source and also receives electrical conductors (C) from the pump. A common wall (30) between the housing (12) and the junction box (14) includes the sealed apertures (50) therein for the transfer of lead lines (L) from the electrical control components (32, 34, 36, 38) to the junction box (14) where they are connected to the power source and the electrical conductors (C).

9 Claims, 3 Drawing Figures

MOTOR CONTROL HOUSING AND JUNCTION BOX FOR A SUBMERSIBLE PUMP

TECHNICAL FIELD

This invention relates to an apparatus for housing the motor controls for a submersible pump. More particularly, this invention relates to a motor control housing and junction box which can be readily disassembled for repair and replacement yet which is sealed such that it can be located within the sump within which the submersible pump is operating.

BACKGROUND ART

The motor and other controls of the prior art for a submersible pump of the type often located in a sump or basin have been located on a pole above ground level with lines running to a connection or junction box internally of the sump. As such, in order to maintain the controls, the repairman was not only exposed to the elements, but often also had to spend vast amounts of field time tracing the problem which could ultimately result in the necessity of breaking cement seals used in the connection box. In addition, the cost of erecting and protecting the motor control unit above ground added greatly to the overall cost of the system, as well as being an unsightly addition to the landscape.

DISCLOSURE OF THE INVENTION

It is thus a primary object of the present invention to provide an integral, sealed pump motor control housing and junction box wholly underground within the sump or basin.

It is another object of the present invention to provide a pump motor control housing which is readily removable from the junction box for maintenance at a remote location.

It is a further object of the present invention to provide a pump motor control housing which is readily replaceable due to the ease of connection with the junction box.

It is an additional object of the present invention to provide a pump motor control housing and junction box which is less costly to manufacture, install and maintain.

These and other objects of the present invention, which will become apparent from the description to follow, are accomplished by the means hereinafter described and claimed.

In general, the invention includes a housing for a plurality of electrical components and a junction box attached thereto. The junction box receives a conduit providing electrical power from a power source and electrical conductors from the pump. A common wall between the housing and the junction box is provided and includes sealed apertures therein for the transfer of lead lines from the motor controls to the junction box where they are connected to the power source and electrical conductors. Both the housing and the junction box are totally sealed from each other and the outside so that they can be safely positioned with a sump.

PREFERRED EMBODIMENT FOR CARRYING OUT THE INVENTION

Figure 1:
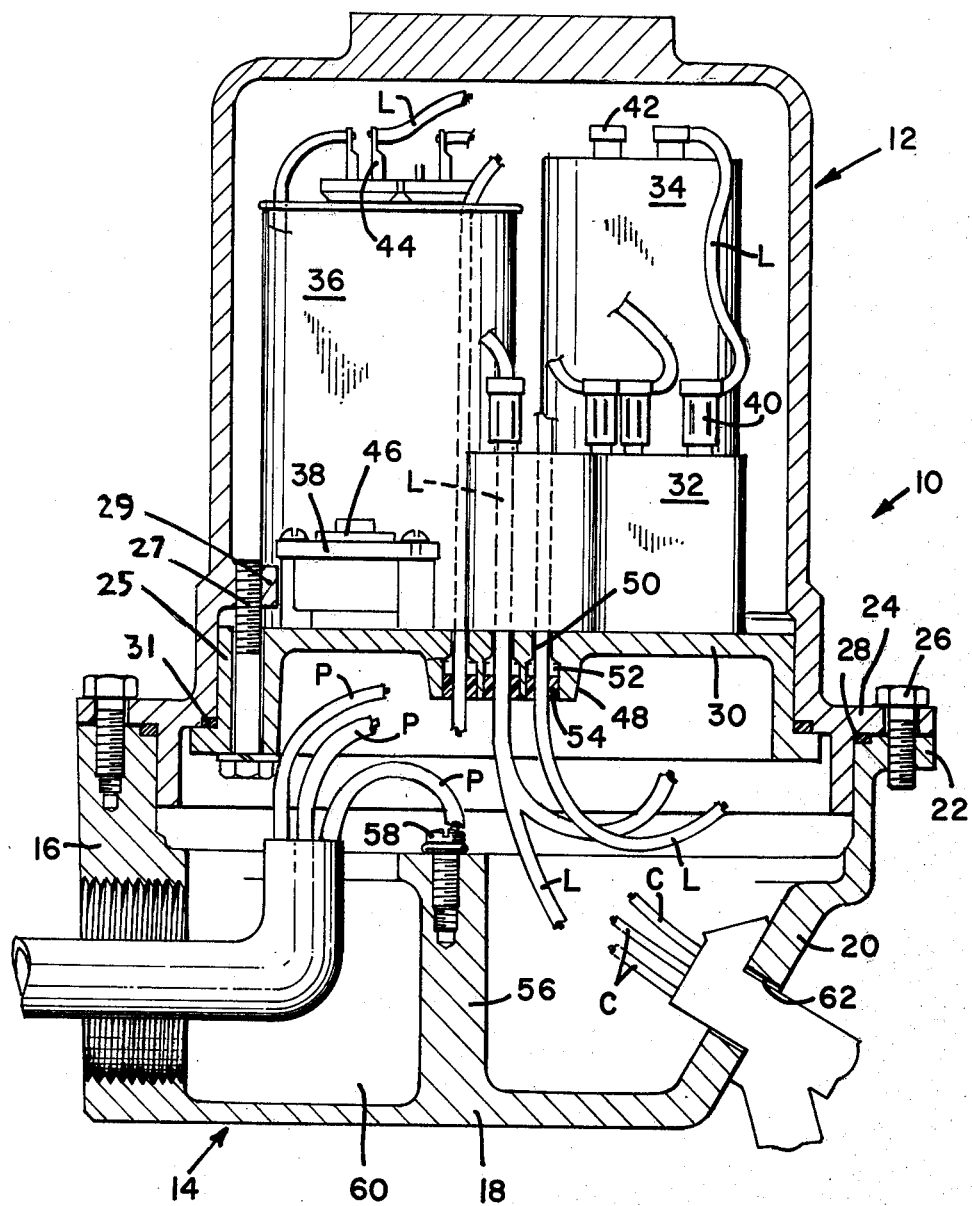
FIG. 1 is a sectional view of a motor control housing and junction box according to the concept of the present invention.
Figure 2:
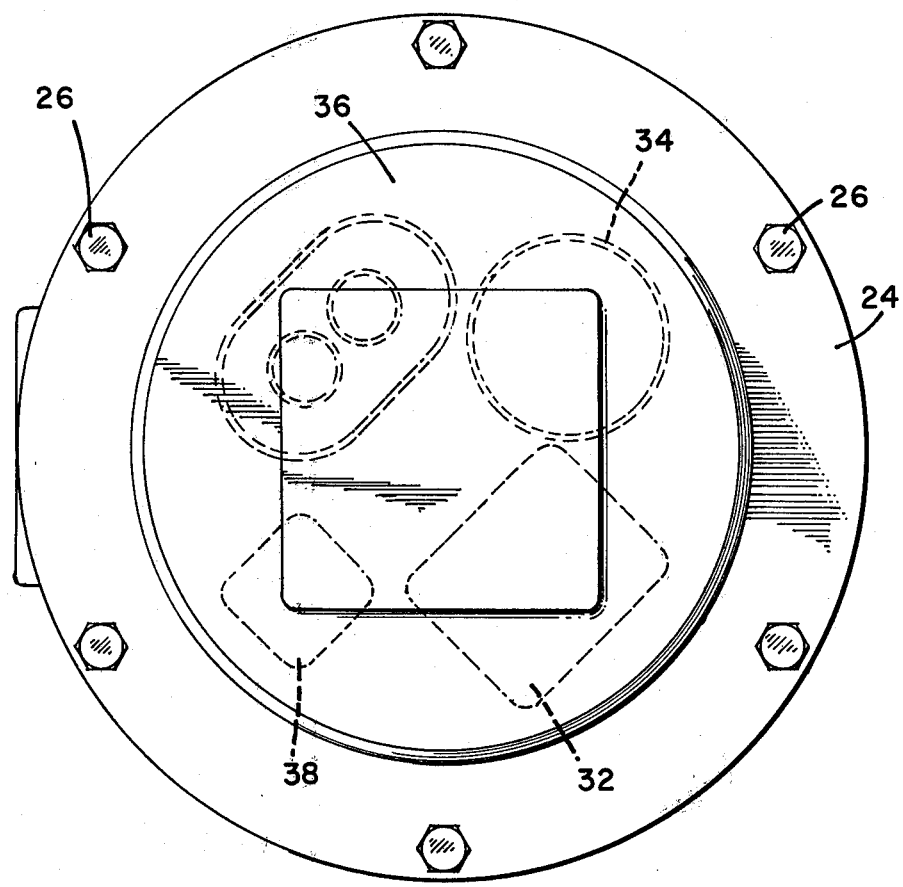
FIG. 2 is a top plan view of the motor control housing shown in FIG. 1.

The combined housing and junction box for housing and electrically connecting a plurality of motor control components is indicated generally by the numeral 10 and shown in detail in FIG. 1, as including a cylindrical or cup shaped housing or cover 12 and a junction box indicated generally by the numeral 14. Junction box 14 is annular in nature having, as viewed in FIG. 1, a generally vertical wall 16 terminating at a generally horizontal bottom wall 18. The opposite end of wall 18 extends into an upwardly angled wall 20 which terminates at its upper end as an annular flange 22. Housing 12 is provided at its lower end with an annular flange 24 adapted to align with flange 22 and the top of vertical wall 16 of junction box 14 for engagement, as by a plurality of cap screws 26. A gasket 28 provides a seal between housing 12 and junction box 14.

A generally circular mounting plate 30 forms a common internal wall between housing 12 and junction box 14 and is provided with a plurality of bosses 25 (one shown) to receive bolts 27 that engage corresponding lugs 29 (one shown) extending inwardly of housing 12. In this manner, plate 30 is affixed to housing 12 with the enclosure being sealed by gasket 31. Plate 30 carries a plurality of motor control components thereon to be sealed within housing 12. While any variety of components could be housed within housing 12 without departing from the spirit of this invention, depending on the particular motor control desired, shown herein are the controls necessary or desirable for a single phase induction type motor with split phase windings and a capacitor start. As such, plate 30 carries, in this example, a control relay 32, a start capacitor 34, a run capacitor 36 and an automatic overload reset circuit 38. Terminals 40, 42, 44 and 46 are provided for each of the electrical components, relay 32, capacitor 34, capacitor 36 and circuit 38, respectively, to provide connections for lead lines L so that the components may be electrically connected in a manner shown in FIG. 3 to be hereinafter described. Plate 30 is provided with a hub 48 generally centrally thereof which has a plurality (three shown) of counterbored holes 50 therein. Lead lines L pass through holes 50 with a sealing arrangement being provided by rubber ferrules 52 and bronze ferrules 54 set in the counterbores. Thus although the components are sealed in housing 12, the lead lines L therefore are exposed internally of junction box 14.

Vertical wall 16 of junction box 14 is tapped for threaded engagement with a conduit (not shown) which carries an electrical power conduit or cable of wires P to provide power from a remote source. Bottom wall 18 of junction box 14 is provided with an upstanding wall 56 which can conveniently serve as a ground post for the ground wire P by utilizing a screw 58 or the like. Wall 56 also serves to provide a small chamber or trough within junction box 14 into which a sealing compound or cement 60 can be poured to seal the inlet for the cable of wires P thereby eliminating the need for an expensive fitting. Junction box 14 is also provided with a plurality of threaded openings 62 (FIG. 1), 64 and 66 (FIG. 3) for receiving electrical conductors C, the nature of which will be hereinafter described. Conventional compression cord grips can be threaded into these openings for sealingly maintaining conductors C in place.

Figure 3:
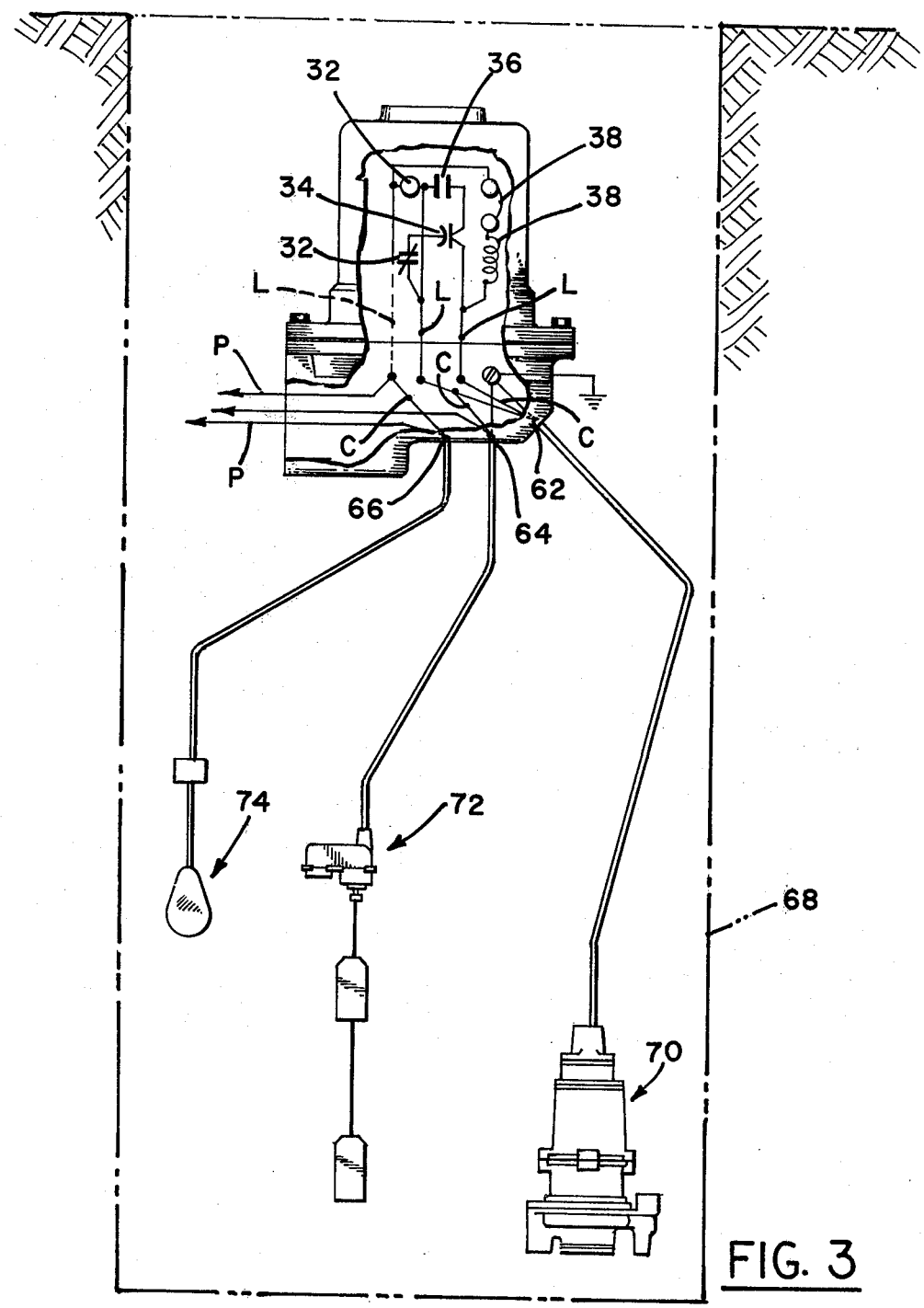
FIG. 3 is a schematic representation of the motor control housing and junction box shown in the environment of a sump and in use with a submersible pump, level control, and alarm control, the control components within the housing being shown in electrical schematic form.

FIG. 3 is intended to schematically show housing 12 and junction box 14 within a sump 68 which is being serviced by a conventional pump 70. It is the conductors C from pump 70 which are shown as being provided to junction box 14 through opening 62. Also provided within sump 68 is a level control 72 which can be of the type described in U.S. Pat. No. 4,001,533 which turns pump 70 on or off dependent on the level of the water in sump 68. It is the conductors C from level control 72 which are shown as being provided to junction box 14 through opening 64. An alarm float 74 can also be provided in sump 68 to activate a light or the like at a remote location should system failure cause the sump to overfill. It is the conductors C from alarm float 74 which are shown as being provided to junction box 14 through opening 66.

Although it is not critical to the subject invention as to the precise nature of the control components in housing 12, the invention has been illustrated for use to operate a single phase induction type motor for pump 70 having split phase windings, a permanent capacitor running circuit, and a capacitive start circuit. As is well known in such systems, during start up, starting capacitor 34 is placed in parallel with the normal running capacitor 36 to increase the phase differential between the current through the running and starting winding of the motor of pump 70 thereby increasing starting torque and reducing the required starting current. As shown, relay 32 has its coil placed in parallel with the starting winding of the motor and its normally closed contact in series with starting capacitor 34. Upon initial energization the voltage across the starting winding of the motor is insufficient to energize control relay 32 and its contact remains closed to keep starting capacitor 34 in parallel with running capacitor 36. However, when the current through the starting winding becomes sufficiently great to provide a voltage thereacross of sufficient amount to energize relay 32, the contact will open putting starting capacitor 34 out of the circuit. Thereafter the motor operates in its usual split phase mode with only running capacitor 36 permanently remaining in its power circuit. As previously described, the off/on mode of the motor is controlled by level control 72 dependent on the water level in sump 68. In the event of a circuit overload, reset circuit 38, which includes a thermal overload relay and normally closed circuit breaker, is activated to open the circuit until the thermal relay cools down.

In order to assemble the housing 12 and junction box 14, one need only assembly the junction box with power lines P from the power conduit and conductors C from pump 70, level control 72, and alarm control 74 therein. Then a preassembled housing with lines L extending through plate 30 can be moved into position and the electrical connections shown in FIG. 3 are established. With such connections established, housing 12 can be connected to junction box 14 and the unit is ready for operation. If a malfunction exists such that repair and/or replacement of any of the components in housing 12 is necessary, all that need be done is to remove housing 12, disconnecting lines L from the other lines, and replace the unit with a new housing and components so that remote repair is readily possible.

It should thus be evident that a motor control housing and junction box for a submersible pump constructed according to the concept of the present invention will accomplish the objects thereof and substantially improve the art.

We claim:

1. In combination with a pump driven by a motor which receives power from a power source and which is controlled by a plurality of motor control components, a housing for said plurality of motor control components, electrical lead lines extending from said motor control components, a junction box attached to said housing, means defining a trough in said junction box, a conduit carrying the electrical power from said power source, means in said junction box to receive said conduit, a sealing compound in said trough to seal the point of entry of said conduit into said junction box, electrical conductors extending from said pump, means in said junction box to receive said electrical conductors, a common wall between said housing and said junction box, means to seal said housing and said junction box, and means in said common wall to sealingly transfer the lead lines from the motor control components in said housing to said junction box for connection with the power source through said conduit and said electrical conductors from said pump.

2. In combination with a pump driven by a motor which receives power from a power source and which is controlled by a plurality of motor control components, a housing for said plurality of motor control components, electrical lead lines extending from said motor control components, a junction box attached to said housing, a conduit carrying the electrical power from said power source, means in said junction box to receive said conduit, electrical conductors extending from said pump, means in said junction box to receive said electrical conductors, a common wall between said housing and said junction box, means between said housing and said junction box to seal said housing and said junction box, means between said housing and said common wall to seal said housing and said common wall, and means in said common wall to sealingly transfer the lead lines from the motor control components in said housing to said junction box for connection with the power source through said conduit and said electrical conductors from said pump.

3. The combination of claim 2 wherein said means in said common wall includes a plurality of counterbored apertures through which the lead lines pass, and ferrule means in said apertures surrounding the lead lines to seal the apertures.

4. The combination of claim 2 wherein said housing includes an annular flange thereon for mating engagement with said junction box.

5. The combination of claim 2 wherein said junction box includes means to provide an electrical ground.

6. The combination of claim 2 wherein the motor control components include a control relay, starting capacitor, running capacitor and overload circuit for a single phase induction motor to operate said pump.

7. The combination of claim 2 further including a level control device and an alarm control device, said pump, level control device and alarm control device being located in a sump, and means in said junction box to receive the electrical conductors of said level control device and said alarm control device.

8. The combination of claim 2 further comprising means to mount said common wall to said housing.

9. The combination of claim 8 wherein said motor control components are carried by said common wall.

* * * * *